(12) United States Patent
Büchel et al.

(10) Patent No.: US 7,444,244 B2
(45) Date of Patent: Oct. 28, 2008

(54) METHOD AND DEVICE FOR DETERMINING A VARIABLE CHARACTERISTIC OF A MASS THAT RESTS ON THE SEATING AREA OF A SEAT

(75) Inventors: Mathias Büchel, Regensburg (DE); Gerald Schicker, Maxhütte-Haidhof (DE); Gerd Winkler, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/591,487

(22) PCT Filed: Mar. 24, 2005

(86) PCT No.: PCT/EP2005/051381

§ 371 (c)(1),
(2), (4) Date: Sep. 1, 2006

(87) PCT Pub. No.: WO2005/092672

PCT Pub. Date: Oct. 6, 2005

(65) Prior Publication Data

US 2007/0187156 A1  Aug. 16, 2007

(30) Foreign Application Priority Data

Mar. 26, 2004  (DE) ................ 10 2004 015 000

(51) Int. Cl.
*G01G 9/00* (2006.01)

(52) U.S. Cl. ..................... 702/41; 702/173; 701/45

(58) Field of Classification Search ............. 702/41–43, 702/101, 102, 129, 139, 173–175; 177/136, 177/138, 144; 340/438, 440, 457.1; 700/305; 701/45

See application file for complete search history.

(56) References Cited

U.S. PATENT DOCUMENTS

| 6,087,598 A | 7/2000 | Munch ..................... 177/144 |
| 6,442,504 B1* | 8/2002 | Breed et al. ................ 702/173 |
| 6,476,516 B1* | 11/2002 | Reich ....................... 307/10.1 |
| 6,587,770 B1 | 7/2003 | Gray et al. .................. 701/45 |
| 7,034,670 B2* | 4/2006 | Kennedy et al. ........... 340/438 |
| 2002/0118104 A1 | 8/2002 | Sakai et al. ................ 340/438 |
| 2005/0088274 A1 | 4/2005 | Wild ......................... 338/114 |

FOREIGN PATENT DOCUMENTS

| DE | 197 41 451 A1 | 3/1999 |
| DE | 101 60 121 A1 | 6/2003 |
| EP | 0 930 032 A1 | 7/1999 |
| EP | 1 599 369 B1 | 11/2005 |
| JP | 04005538 A * | 1/1992 |
| WO | 2004/078531 A1 | 9/2004 |

* cited by examiner

*Primary Examiner*—Manuel L Barbee
(74) *Attorney, Agent, or Firm*—Laurence A. Greenberg; Werner H. Stemer; Ralph E. Locher

(57) ABSTRACT

A method and a device allow to detect and optionally to indicate the improper use of a seat. For this purpose, an estimated value of a variable characteristic of a mass that rests on a seating area of a seat is determined depending on at least one force that acts upon the seating area and that is detected by one or more force sensors. The estimated value is found to be reliable or unreliable depending on the oscillation behavior of the measured signal of the at least one force sensor.

5 Claims, 2 Drawing Sheets

Figure 1:
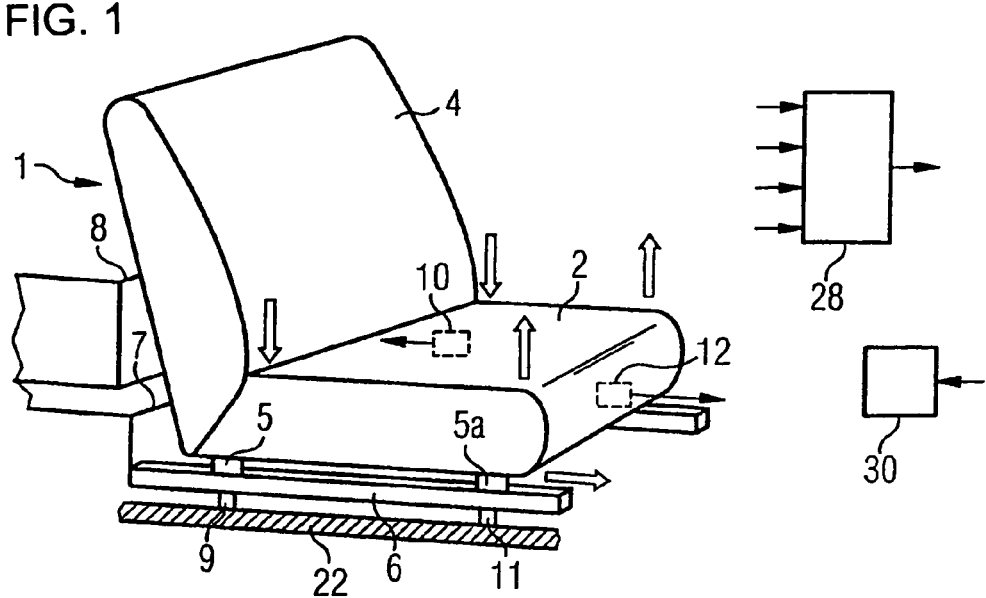

METHOD AND DEVICE FOR DETERMINING A VARIABLE CHARACTERISTIC OF A MASS THAT RESTS ON THE SEATING AREA OF A SEAT

BACKGROUND OF THE INVENTION

Field of the invention

The invention relates to a method and a device for determining a variable that is characteristic of a mass that rests on the seating area of a seat, especially one that is installed in a vehicle.

In modern motor vehicles there is an increasing number of occupant restraint means, such as front airbags, side airbags, knee airbags and curtain airbags. Such occupant restraint means are designed to provide the best possible protection to the vehicle occupants in the event of an accident. This can be achieved in that the deployment area of the occupant restraint means is matched to the particular vehicle occupants in the vehicle. Therefore the risk of injury to babies or small children in the event of an accident can be less if the occupant restraint means do not deploy.

Furthermore, the occupant restraint means should be activated in the event of an accident only where occupants are actually located, the risk of injury to whom is thus reduced. In this way, additional unnecessary high repair costs after an accident can be avoided. For these reasons, it is important to detect the occupancy of a seat of a motor vehicle by an occupant and also to classify these occupants with regard to their characteristics, e.g. with respect to body weight. In this respect, Crash Standard FMVSS 208 is receiving increasing attention. Compliance with it is demanded by numerous vehicle manufacturers. It specifies a classification of the respective vehicle occupants according to their weight, in order in the event of a collision to adapt the control of an occupant restraint means suitably to the identified person as required. To determine the weight of an occupant it is known, for example, from DE 101 601 21 A1, to arrange pressure-sensitive sensor pads in a seating area of the seat and to determine the weight of the occupant from the measured signals from such seat sensor pads.

From U.S. Pat. No. 6,087,598, a weight detection device is known for determining the weight that bears on a vehicle seat of a motor vehicle. First to fourth force sensors are assigned to the vehicle seat, each of which detects forces that act on specific areas of the seating area. The first to fourth force sensors are connected in the area of an underside of the seat cushion underneath the seating area and are also connected to the chassis of the motor vehicle. They are arranged in such a way that they each determine the force acting on the seating area of the seat. In the event of an accident, occupant protection devices such as airbags, head airbags, side airbags or similar, are triggered depending on the measured signals from the sensors.

Furthermore, it is known that an incorrect use of a vehicle seat to which at least one force sensor is assigned that detects the force in the area of the seating area of the seat can lead to a spurious measured signal. If such spurious nature of the measured signal remains undetected, this can lead to an incorrect classification of the occupant sitting on the seat. This then in turn means that in the event of an accident the occupant restraint means is not activated in a manner best suited to the particular occupant. Up until now the positions of the vehicle seat that gave rise to such an incorrect use was stated in the operating instructions.

However, this brings with it the danger that the occupant of the vehicle might not be aware of this statement in the operating instructions and thus be unaware of the dangers associated with such incorrect use of the vehicle seat.

SUMMARY OF THE INVENTION

The object of the invention is to provide a method and a device for determining a variable that is characteristic of the mass resting on a seating area of a seat by means of which the reliability of the ascertained variable is determined.

The object is achieved by the features of the independent claims. Advantageous developments of the invention are given in the subclaims.

The invention is characterized by a method, with the following steps, and a corresponding device for determining a variable that is characteristic of a mass that rests on a seating area of a seat. An estimated value of the variable is determined depending upon at least one force that acts on the seating area and is detected by a force sensor. The estimated value is determined as reliable or unreliable depending on the oscillation behavior of the measured signal of the at least one force sensor.

The invention is based on the knowledge that the oscillation behavior of the at least one force sensor is characteristic of the reliability of the estimated value of the variable. The oscillation behavior of the measured signal is caused by oscillations of the bodywork or movements of the occupants on the seat. If the position of the seat changes, so that the estimated value is no longer reliable, the oscillation of the measured signal also changes in a characteristic manner. No additional hardware expense, such as a further sensor, is therefore necessary to determine whether the estimated value is reliable or unreliable.

According to an advantageous embodiment of the invention, the estimated value is determined as reliable or unreliable depending on a mass for the amplitude of the oscillations of the measured signal of at least one force sensor. The amplitude can be particularly simply determined and evaluated. A simple and precise detection as to whether the estimated value is reliable or not is thus enabled. In this respect, it can also be advantageous if only predetermined spectral areas of the oscillation of the measured signal are evaluated.

According to a further advantageous embodiment of the invention, the estimated value is determined as reliable or unreliable depending on a time duration of a predetermined change in the mass of the amplitude of the oscillation of the measured signal of at least one force sensor. By a suitable choice of time duration, any sporadic measuring errors in the measure signal of at least one force sensor can be eliminated, i.e. they do not lead to changes in the determination of whether the estimated value is reliable or unreliable.

According to a further advantageous embodiment of the invention, the measured signal of the force sensor is subjected to a Walsh transformation and the estimated value is determined to be reliable or unreliable depending on a measure for sequential contents of the Walsh transformed signal. The Walsh transformation is also known as a Walsh-Hadamard transformation. It is a discrete orthogonal transformation. It is related to the Fourier transformation. In contrast to the Fourier transformation that uses sine and cosine functions as basic functions from which the transformed signal is emulated, the basic functions for the Walsh transformations are square-wave signals. The basic functions can only detect values +1 and −1. By means of the Walsh transformation, a transformation of the time domain takes place in a sequential range. By transforming the measured signal of at least one force sensor using the Walsh transformation, the oscillation behavior of the measured signal can be simply analyzed, especially with appropriate simple computer hardware that does not have to be suitable for sine or cosine computing operations.

In a further advantageous embodiment of the invention, the mass for the sequential content is formed by adding the amplitudes of predetermined sequences of the Walsh-transformed measured signal. This is particularly simple and a high correlation to the reliable or unreliable estimated value is obtained.

A still more accurate determination of the reliability or unreliability of the estimated value of the variable can be easily achieved if the measured signals of several force sensors are subjected to the Walsh transformation and from these a monitoring value is determined for each measured signal and the estimated value is then determined as reliable or unreliable depending on the monitoring values.

Exemplary embodiments of the invention are explained in the following with the aid of schematic drawings. The drawings are as follows:

BRIEF DESCRIPTION THE DRAWINGS

Figure 2:
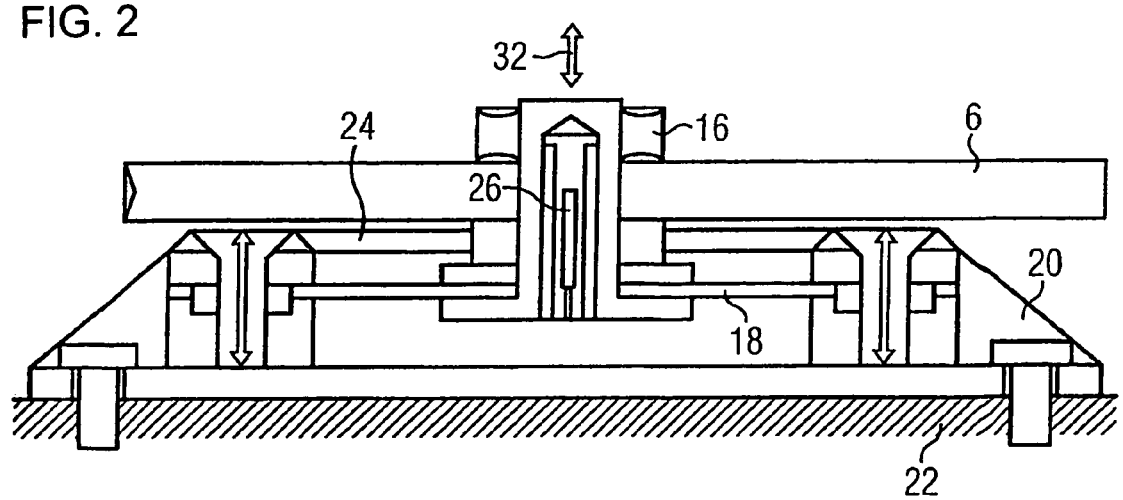
Figure 3:
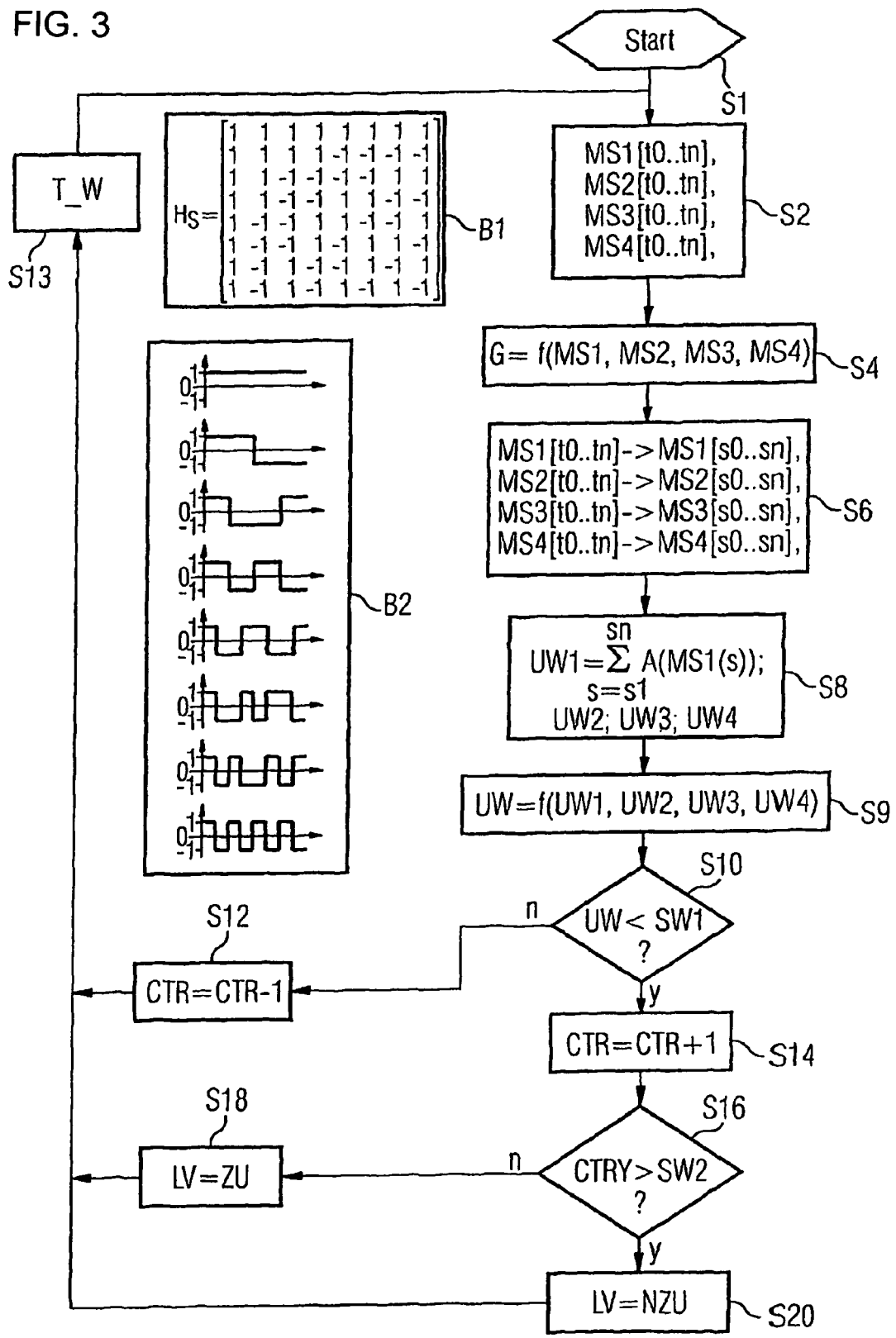

FIG. 1 A seat 1 in a motor vehicle
FIG. 2 A force sensor
FIG. 3 A flow diagram of a program for determining a variable that is characteristic of a mass resting on a seating area of a seat

DESCRIPTION OF THE PREFERRED EMBODIMENTS

Elements with the same construction or function are identified by the same reference characters even when they occur in different illustrations.

A seat 1 is arranged in a vehicle. The seat has a seating area 2 and a backrest 4. A seat frame is formed in the seating area 2 that is connected by guide elements 5, 5a with a retaining device 6 and is thus secured in the vehicle. The retaining device 6 is preferably formed as a guide rail in which the seat 1 is guided and can thus slide along this guide rail. The position of the seat can thus, for example, be adjusted.

In the vehicle interior in which the seat 1 is located there is, for example a projection with an edge 7. The vehicle interior can also have a rear wall that has a further edge 8. If the seat is now slid correspondingly along the retaining device 6 it can, for example, come to a stop against the edge 7. It can also alternatively come to a stop against the other edge 8. In this case, for example, it can come to rest against its backrest 4 or also against another part of the seat such as the seat frame.

A first to fourth force sensor 9-12 is assigned to the seat 1. They are each mechanically connected to the retaining device 6 (FIG. 2) by means of a connecting device 16 and also these first to fourth force sensors 9-12 are connected by the connecting device 16 to a leaf spring 18. The leaf spring 18 is connected at one end to the connecting device 16 and at the other end to a housing element 20. The housing element 20 is attached to a reference device 22, that is preferably part of a chassis of the vehicle. Furthermore, a limiting element 24, that serves as an overload protection in the compression and tension directions with respect to force introduced in the direction shown by the arrow 32, is assigned to the first to fourth force sensor 9-12. A sensor element 26, that for example can detect a deflection of the leaf spring 18 either inductively or capacitively and the measured signal of which is thus representative of the force acting on the leaf spring 18 and thus of the force acting on the retaining device 6, is assigned to the connecting device 16.

As an alternative, the force sensors 9-12 can also be suitably arranged directly in the seat, for example between the seat frame and the guide elements 5, 5a.

The force sensors 9-12 are arranged so that each individual force sensor detects the force that acts on it in the area in one of the corners of the seating area 2. The force sensors 9-12 can also be otherwise formed and arranged. Furthermore, there can be just one, or two, three or more than four force sensors used.

A control device 28 is provided that is designed to determine the variable that is characteristic of the mass that rests on the seating area 2 of the seat 1 and thus can also be regarded as a device for determining the variable that is characteristic of the mass that rests on the seating area of the seat. It is furthermore preferably designed to determine a control signal for the firing unit 30 of an airbag, that is assigned to the seat 1 and is therefore an occupant restraint means.

A program for determining the variable that is characteristic of the mass that rests on the seating area of the seat is stored in the control unit 28 and is processed in the control unit 28 during the operation of the vehicle. The program is explained in more detail in the following with the aid of the flow diagram in FIG. 3. The program is started at step S1 in which variables are initialized as required. Thus, for example, a counter CTR can be initialized. The start preferably takes place close to the time the engine of the motor vehicle starts.

In a step S2, measured signals MS1, MS2, MS3, MS4 of the first to fourth force sensor 9-12 are detected at corresponding discrete time points t0-tn. For example, tn has a value t7, i.e. eight values of the respective measuring signal MS1-MS4 are detected.

Then, in step S4 a weight G that is characteristic of the mass resting on the seating area 2 of the seat 1 is determined. The weight G is determined depending on the measured signals MS1-MS4 of the first to fourth force sensors 9-12. This can be achieved very simply by adding a measured value of the first to fourth measured signal MS1-MS4 in each case.

Alternatively, the mass resting on the seating area 2 can, for example, also be directly determined in step S4.

In a succeeding step S6, the measured signals are subjected to a Walsh transformation and thus transformed from the time domain to the Walsh-transformed sequence domain. The corresponding sequences s are designated with s0-sn. The Walsh transformation is a mapping associated with the Fourier transformation. The basic function of the Walsh transformation is a Boolean function. It can only take the values 1 and −1. The Walsh transformation takes place by multiplying the measured signal vector formed by the measuring signal values with the Hadamard matrix. An example of the Hadamard matrix for a Walsh transformation with a measured signal vector with eight discrete measured signal values is shown in block B1. The multiplication takes place by lines. The individual lines of the Hadamard matrix according to block B1 are shown in signal form by way of example. The zeroed sequence s0 of the respective Walsh transformed represents its steady component. The first sequence s1 represents the fundamental oscillation. The other sequences s2-sn represent harmonics.

In a step S8, a first monitoring value UW1 is then determined by summing the amplitudes A of the transformed measured signal MS1 of the first force sensor 9 over its sequences s1-sn. Alternatively, the sum can also be formed using only selected sequences s, that are suitably chosen and particularly characteristic of the reliability or unreliability of the weight G determined in step S4. Furthermore, in step S8 further corresponding second, third and fourth monitoring values KW1-

KW4 are determined by summing corresponding amplitudes of the sequences s of the second to fourth measured signals MS2, MS3, MS4.

In a step S9, a monitoring value is determined depending on the first to fourth monitoring values UW1-UW4. This can take place either weighted or by a simple summing of the first to fourth monitoring values UW1-UW4.

In a step S10, a check is carried out to determine whether the monitoring value UW is less than a specified first threshold value SW1. The specified first threshold value SW1 is preferably determined by corresponding tests on a vehicle or by simulation, and in such a way that if it is undershot by monitoring value UW there is a high probability that the weight G determined in step S4 is not reliable. This can be due to the fact that the seat 1 is, for example, resting against the edge 7 or other edge 8 or is tilted against it. The consequence of this is that the introduction of the force from the seating area 2 to the force sensors 9-12 is changed and thus the respective measured signal of the first to fourth force sensors 9-12 has a changed characteristic.

If the condition of step S10 is not fulfilled, the counter CTR is decremented in step S12 by a predetermined value, that can for example be 1. Alternative, the counter can also be reset to its initialization value.

If on the other hand, the condition of step S10 is fulfilled, the counter CTR is incremented in step S14 by a predetermined value, that can for example be 1.

In step S16, a check is then carried out to determine whether the counter CTR is greater than a second threshold value SW2, that is permanently specified. If this is not the case, a logic variable LV is given a reliability value ZU in step S18. If on the other hand, the condition of step S16 is met, the logic variable LV is provided with an unreliability value NZU in step S20.

If the logic variable LV is provided with an unreliability value NZU, this can, for example, be signaled to the driver of the vehicle, for instance acoustically or visually, and the driver can be requested to move the seat to a different position. Alternatively, or in addition, an entry that can be evaluated after an accident if required can be entered in a memory in which operating data is stored.

Following steps S12, S18 and S20, the program is continued in a step S13 in which it dwells for a predetermined waiting time T_W before step S2 is again processed. The waiting time duration T_W is furthermore suitably chosen so that step S2 and the succeeding steps are processed at a predetermined frequency during the operation of the vehicle.

Alternatively, fewer than all the measured signals MS1-MS4 of the first to fourth force sensors 9-12 can also be detected in step S2, for example only measuring signal MS1 of the first force sensor 9. Correspondingly, the weight G can then be determined in step S4 only depending on the measured signals MS1-MS4 determined in step S2. Furthermore, regardless of steps S2 and S4 fewer than the first to fourth measured signals MS1-MS4 can be subjected to a Walsh transformation in step S6, for example, only the measured signal MS1 that is assigned to the first force sensor 9. Therefore only a corresponding determination of the relative monitoring value UW1 is determined in step S8 and step S9 is then adapted accordingly.

We claim:

1. A method for determining a variable that is characteristic of a mass resting on a seating area of a seat, the method which comprises:
    detecting at least one force acting on the seating area with at least one force sensor and outputting a measurement signal;
    determining an estimated value of the variable that is characteristic of the mass resting on the seating area in dependence on that at least one force acting on the seating area;
    defining the estimated value as being reliable or unreliable depending on an oscillation behavior of the measurement signal of the at least one force sensor;
    subjecting the measurement signal of the force sensor to a Walsh transformation and determining the estimated value to be reliable or unreliable depending on a measure for a sequential content of a Walsh-transformed measurement signal; and
    forming the measure for the sequential content by adding amplitudes of predetermined sequences of the Walsh-transformed measurement signal.

2. The method according to claim 1, which comprises measuring a plurality of forces with a plurality of force sensors outputting respective measurement signals, and subjecting the measurement signals of the force sensors to the Walsh transformation, determining therefrom a monitoring value for each measurement signal, and defining the estimated value as being reliable or unreliable depending upon the monitoring values.

3. The method according to claim 1, wherein the defining step comprises determining the estimated value to be reliable or unreliable depending on a measure of an amplitude of the oscillations of the measurement signal of the at least one force sensor.

4. The method according to claim 1, wherein the defining step comprises determining the estimated value to be reliable or unreliable depending on a time duration of a predetermined change in the measure of the amplitude of the oscillation of the measurement signal.

5. A device for determining a variable that is characteristic of a mass resting on a seating area of a seat, the device comprising:
    at least one force sensor disposed to measure at least one force acting on the seating area and to output a measurement signal;
    means, connected to receive the measurement signal, for determining an estimated value of the variable that is characteristic of the mass resting on the seating area in dependence on the at least one force measured by the force sensor; and
    means for determining whether the estimated value is reliable or the estimated value is unreliable in dependence on an oscillation behavior of the measurement signal of the at least one force sensor, wherein the determining means subjects the measurement signal of the force sensor to a Walsh transformation and determines the estimated value to be reliable or unreliable depending on a measure for a sequential content of a Walsh-transformed measurement signal, and the determining means forms the measure for the sequential content by adding amplitudes of predetermined sequences of the Walsh-transformed measurement signal.

* * * * *